(12) United States Patent
Jin et al.

(10) Patent No.: US 6,801,873 B1
(45) Date of Patent: Oct. 5, 2004

(54) ANALYSIS OF ROTATING MACHINES

(75) Inventors: Wei Jin, Shanghai (CN); Shie Qian, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 10/393,963

(22) Filed: Mar. 21, 2003

(51) Int. Cl.$^7$ ............................................. G01P 3/00
(52) U.S. Cl. .................. 702/147; 702/145; 702/165; 73/660
(58) Field of Search .................. 702/145, 147–148, 702/150, 163, 165, 190; 73/660; 324/160, 163; 242/334.3–334.4; 322/29, 31

(56) References Cited

U.S. PATENT DOCUMENTS

| | | | |
|---|---|---|---|
| 4,912,661 A | 3/1990 | Potter | |
| 5,235,534 A | 8/1993 | Potter | |
| 5,445,028 A | 8/1995 | Bianchi et al. | |
| 5,473,555 A | 12/1995 | Potter | |
| 6,332,116 B1 * | 12/2001 | Qian et al. | 702/183 |
| 6,351,714 B1 | 2/2002 | Birchmeier | |
| 6,453,273 B1 | 9/2002 | Qian et al. | |
| 6,477,472 B2 | 11/2002 | Qian et al. | |

OTHER PUBLICATIONS

Havard Vold & Jan Leuridan, "High Resolution Order Tracking at Extreme Slew Rates, Using Kalman Tracking Filters", SAE Paper No. 931288, 1993, 8 pages.

* cited by examiner

*Primary Examiner*—John Barlow
*Assistant Examiner*—Meagan S Walling
(74) *Attorney, Agent, or Firm*—Meyertons Hood Kivlin Kowert & Goetzel, P.C.; Jeffrey C. Hood; Mark S Williams

(57) ABSTRACT

System and method for analyzing an input signal acquired from a physical system with a rotating element. A tachometer signal is received comprising rotation speed information for the rotating element. A time sequence is determined using the tachometer signal, comprising time values for the rotating element at substantially equal angle increments, e.g., by edge detection software or timer/counter. A software-based first digital interpolation filter, e.g., a Cascade-Integrator-Comb filter, is applied to the time sequence, generating a modified time sequence. A digitized data signal is received comprising data for the rotating element at substantially equal time increments. A second software-based digital interpolation filter is applied to the data signal, generating a modified data signal which is re-sampled using the modified time sequence to generate an angle domain data signal, comprising data signal values at substantially equal angle increments, where the angle domain data signal is usable to analyze the physical system.

27 Claims, 16 Drawing Sheets

Tachometer Signal with
Square Wave Pulses
602

Discrete
Tachometer Signal
603

Digital Tachometer
Signal
604

Time Sequence
630

Interpolated
Time Sequence
640

Interpolated
Time Sequence
Plot
644

Tachometer Signal with Square Wave Pulses
602

Discrete Tachometer Signal
603

ANALYSIS OF ROTATING MACHINES

FIELD OF THE INVENTION

The invention relates generally to signal analysis systems or test and measurement systems, and more particularly to a computer-based system and method for analyzing order components of a signal generated by a physical system, e.g., a mechanical system containing one or more rotating elements.

DESCRIPTION OF THE RELATED ART

Scientists and engineers often use test and measurement systems and data acquisition systems to perform a variety of functions, including laboratory research, process monitoring and control, data logging, analytical chemistry, test and analysis of physical phenomena and analysis or control of mechanical or electrical machinery, to name a few examples. One example of hardware to implement such measuring systems is a computer-based measurement system or data acquisition (DAQ) system. Another example of a measurement system is a dedicated instrument, such as a dedicated oscilloscope or signal analyzer.

A measurement system typically may include transducers for measuring and/or providing electrical signals, signal conditioning hardware which may perform amplification, isolation and/or filtering, and measurement or DAQ hardware for receiving digital and analog signals and providing them to a processing system, such as a processor or personal computer. The computer-based measurement system or dedicated instrument may further include analysis hardware and software for analyzing and appropriately displaying the measured data.

One example where measurement and data acquisition systems are used is in the field of rotating machinery analysis. This involves the analysis of physical signals such as vibration or acoustic signals from a rotating machine. A physical signal acquired from a rotating machine may be sampled or digitized. Typically, samples of the physical signal are equidistant in time, i.e., are acquired at constant time increments. However, rotating machines generate signals which are periodic with respect to shaft rotation, i.e., rotation angle of an underlying rotating element (e.g. a crank shaft of an engine). These rotation-periodic signals are referred to herein as order components. When the rotation rate changes in time, the order components change correspondingly in frequency. For example, when the rotation rate increases, the order components increase in frequency. Thus, a traditional analysis method such as the Discrete Fourier Transform (DFT), when applied to the physical signal, displays a frequency smearing of order components. The frequency smearing makes it very difficult to derive meaningful information about the order components. Thus, traditional signal analysis methods such as the Fourier Transform of the time domain input signal are not well suited for analyzing order components generated by rotating machines.

In order to better analyze the performance and characteristics of rotating machines, certain prior art systems convert the time-samples, i.e., the samples of the physical signal which are equally spaced in time, to angle-samples, i.e., samples which are equally spaced in shaft angle. For example, U.S. Pat. No. 4,912,661 assigned to Hewlett-Packard discloses an interpolation method for estimating angle-samples from time-samples. The method disclosed in U.S. Pat. No. 4,912,661 performs an interpolation of the time domain signal, followed by a re-sampling, in order to produce samples equally spaced with respect to shaft angle. The order components may then be analyzed by performing a traditional analysis method such as the Discrete Fourier Transform on the angle-samples. The process of U.S. Pat. No. 4,912,661 uses a piece-wise polynomial curve fit to smooth data prior to re-sampling. However, this approach may result in discontinuities at boundaries of the polynomial pieces or segments. One prior art system known as the Vold-Kalman filter allows the user to track the frequency of an order component given a sufficiently accurate model for the physical signal. The Vold-Kalman filter performance may be strongly sensitive to model accuracy. In other words, the tracking performance is likely to be degraded when an inaccurate signal model is supplied to the filter. Furthermore, the Vold-Kalman filter provides no mechanism for the user to evaluate the accuracy of the frequency tracking for an order component.

Therefore, there exists a need for a system and method which can more accurately and robustly analyze order components of a physical signal, and reconstruct desired order components from the time domain in the angle domain.

SUMMARY

One embodiment of the present invention comprises a computer-based method for analyzing a signal X acquired from a physical system with a rotating element. In one embodiment, a tachometer signal may be received, where the tachometer signal includes a first plurality of samples, and where the tachometer signal includes rotation speed information for the rotating element. The tachometer signal may be generated by a tachometer, where the tachometer measures rotation of the rotating element, and generates a fixed number of pulses per revolution. In one embodiment, an analog to digital converter (ADC), also referred to as a digitizer, may be used to digitize the tachometer pulse signal to generate a discrete tachometer signal. Then, software edge detection may be performed on the discrete tachometer signal to generate a time sequence corresponding to pulse arrival times, where the time sequence indicates each time the rotating element has rotated a certain angle. In other words, the time sequence contains time values of substantially equal angle interval. In an embodiment where the tachometer signal is a Transistor-Transistor Logic (TTL) level compatible square wave, the time series of pulse arrival time may be determined directly from the tachometer signal, e.g., using a timer/counter, and thus the time sequence may be determined without having to digitize and perform software edge detection on the tachometer signal. A first digital interpolation filter may then be applied to the equal angle time sequence to generate a modified a modified time sequence. In other words, the first digital interpolation filter may be used to smooth and/or increase the resolution of the time sequence. In a preferred embodiment, the first digital interpolation filter may be a finite impulse response (FIR) filter, such as, for example, a Cascade Integrator-Comb (CIC) filter. The modified time sequence includes time values for the rotating element at substantially equal angle increments, e.g., of a desired resolution. In other words, the original time sequence may be at a first angular resolution, and the first digital interpolation filter may be applied to the original time sequence to generate the modified time sequence at a second angular resolution, where the second angular resolution is higher than the first angular resolution. Thus, in one embodiment, the determined time sequence includes time values at the second (e.g., higher) angular resolution. In one embodiment, the time sequence may be stored, e.g., in a storage medium, for later use.

A digital data signal may be received, where the digital data signal includes a second plurality of samples, and where the digital data signal includes data for the rotating element at substantially equal time increments. In one embodiment, the digital data signal may be generated by using an analog-to-digital converter (ADC) to digitize a received analog data signal from a sensor, where the sensor measures an attribute of the rotating element. In other words, the ADC may digitizing the analog data signal to generate the digital data signal. A second digital interpolation filter may be applied to the digital data signal to generate a modified data signal. In other words, as described above, the second digital interpolation filter may be applied to the digital data signal to smooth and/or increase the resolution of the digital data signal. In a preferred embodiment, the second digital interpolation filter may also be a finite impulse response (FIR) filter.

The modified data signal may then be re-sampled using the determined time sequence to generate an angle domain data signal, where the angle domain data signal includes data signal values at substantially equal angle increments. The angle domain data signal may then be usable to analyze the physical system. In one embodiment, a Fast Fourier Transform (FFT) may be performed on the angle domain signal to generate order spectrum information which may be usable to analyze the physical system.

In one embodiment, the angle domain data signal may be output. For example, the angle domain data signal may be output to a storage medium and/or a display device for display, e.g., a computer monitor or printer.

Thus, various embodiments of the present invention may be used to convert time domain data related to a rotating element of a physical system to angle domain data at substantially equal angular increments. Additionally, the present method is substantially more accurate and more flexible than prior art methods.

BRIEF DESCRIPTION OF THE DRAWINGS

A better understanding of the present invention can be obtained when the following detailed description of the preferred embodiment is considered in conjunction with the following drawings, in which.

Figure 1A:
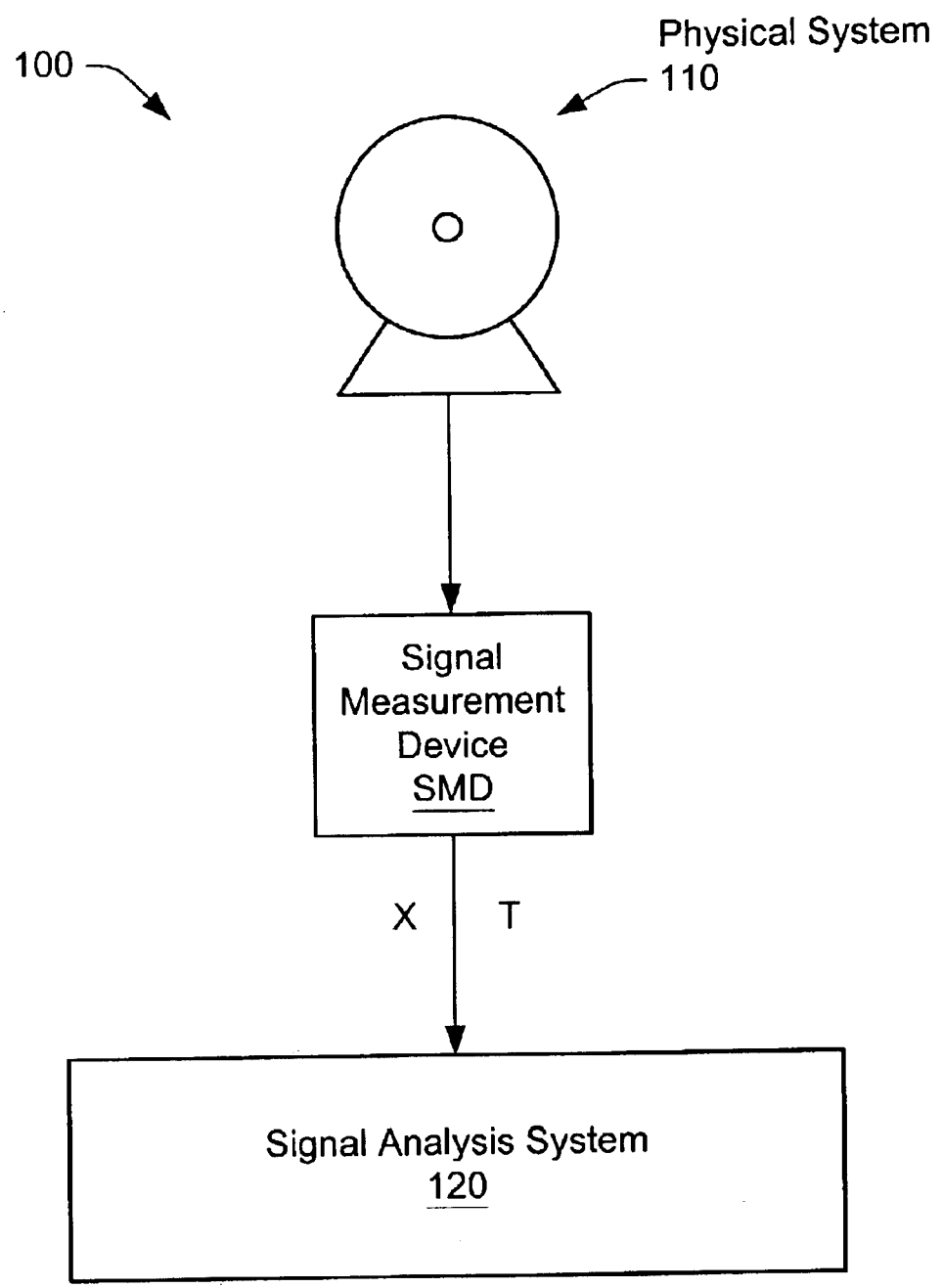
FIG. 1A illustrates a system configuration for analyzing physical signals acquired from a mechanical system comprising one or more rotating elements.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

U.S. Pat. No. 4,912,661 titled "Tracking and Resampling Method and Apparatus for Monitoring the Performance of Rotating Machines" whose inventor is Ronald W. Potter, which was issued on Mar. 27, 1990, is hereby incorporated by reference as though fully and completely set forth herein.

U.S. patent application Ser. No. 09/636,097 titled "System and Method for Analyzing Signals Generated by Rotating Machines", whose inventors are Shie Qian, Hui Shao, and Wei Jin, which was filed on Aug. 10, 2000, is hereby incorporated by reference as though fully and completely set forth herein.

Joint Time-Frequency Analysis—Methods and Applications by Shie Qian and Dapang Chen, published by Prentice-Hall, ISBN 0-13-254384-2, is hereby incorporated by reference as though fully and completely set forth herein.

FIG. 1A—System for Analyzing Rotary Machinery

FIG. 1A illustrates a system configuration 100 for performing signal analysis related to a rotary machine. System configuration 100 may comprise a physical system 110 to be analyzed, a signal measurement device SMD and a signal analysis system 120 which may also be referred to as a measurement system. Physical system 110 may be a mechanical system which contains one or more rotating elements. For example, physical system 110 may be an automobile engine, an aircraft engine, a turbine, a disk drive, a tape drive, a fan motor, a boat propeller, or any other machine or device having a rotating element.

Signal measurement device SMD is preferably placed proximate to (e.g., on or close to) the physical system 110. Signal measurement device SMD may measure a physical signal generated by physical system 110 and transduce the physical signal into a corresponding electrical signal X. Signal measurement device SMD may present the electrical signal X to signal analysis system 120 in analog and/or digital form. Thus, in one embodiment, signal measurement device SMD includes analog-to-digital conversion hardware. In a second embodiment, digital-to-analog conversion hardware is comprised within signal analysis system 120. Signal measurement device SMD may comprise any of a variety of measurement devices such as a microphone, an accelerometer, a spatial displacement sensor, a strain gauge, a pressure sensor, a temperature sensor (e.g., a thermocouple), a radiation sensor, an optical sensor, etc. In one embodiment, signal measurement device SMD may represent an array of transducers or measurement devices of one or more types. For example, an array of microphones may be distributed at various locations in an engine to acquire audio signals from the engine.

In a preferred embodiment, a rotation sensing device (RSD), such as a tachometer, may be included to detect rotations of a rotating element in the physical system 100. In other words, in addition to the data signal X, a tachometer signal T may also be generated and used as described below. In various embodiments, the tachometer may be included in the SMD, or may be a separate component in the system. In the descriptions that follow, it is assumed that the tachometer is included in the SMD, although this embodiment is considered exemplary, and is not intended to preclude the use of a separate tachometer component in the system.

Figure 1B:
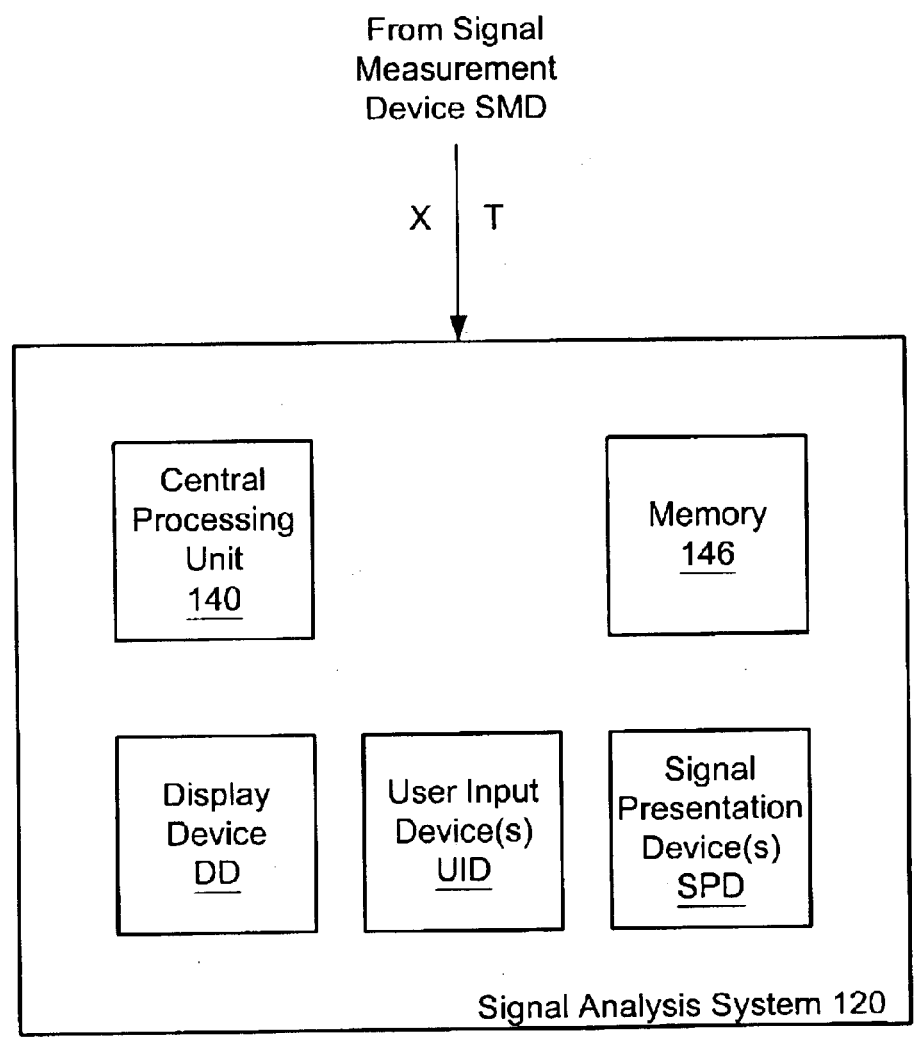
FIG. 1B is a block diagram of one embodiment of a signal analysis system.

Signal analysis system 120 may couple to signal measurement device SMD. Signal analysis system 120 may be configured for analyzing one or more order components of a signal generated by or acquired from physical system 110. Signal analysis system 120 may comprise a processor or central processing unit 140, memory 146, signal presentation device(s) SPD, user input device(s) UID and a display device DD as shown in FIG. 1B. CPU 140 may be realized by any of a variety of computational devices such as a general purpose processor, a digital signal processor, a parallel processor, dedicated digital and/or analog circuitry, programmable gate array logic (e.g., an FPGA), etc., or any combination thereof. Memory 146 may comprise any of a variety of memory devices such as random access memory (RAM) and/or read-only memory (ROM), as described further below. Signal analysis system 120 may also include specialized data acquisition and/or signal conditioning hardware, interface hardware, etc., or any combination thereof.

Signal analysis system 120 may comprise any of various devices, such as a programmable computer system, a computer-based system such as a VXI-based system, a PXI-based system, a GPIB-based system, a computer-based data acquisition system, or a dedicated test instrument, such as a dynamic signal analyzer, an oscilloscope or any other signal acquisition and/or analysis device.

Signal analysis system 120 may operate on samples of the electrical signal X generated by signal measurement device SMD, optionally in response to user input(s) provided through user input device(s) UID, and generate an output signal Y. The output signal Y (or a representation thereof) may be presented to the user through signal presentation device(s) SPD. Similarly, the signal analysis system 120 may also operate on samples of the tachometer signal T and generate a time sequence S. The S signals may be used to generate the output signal Y, as will be described in detail below.

In one embodiment, the signal presentation device(s) SPD may comprise one or more speakers, a display screen (which may be identical to or distinct from display device DD), a projector, a tactile output device, a virtual reality headset, etc., or other types of output devices, or any combination thereof. In one embodiment, signal analysis system 120 may present an audial representation of the output signal Y to a speaker, and/or a graphical depiction of the output signal Y to the display screen. The acoustic or audial presentation (through the speaker) may be especially meaningful in situations where the original physical signal measured by signal measuring device SMD is an acoustic signal, e.g., engine noise.

User input device(s) UID may comprise a keyboard, a pointing device such as a mouse or trackball, a touch pad (such as those used in modern laptop computers for cursor control), a touch sensitive display screen, etc., or other input devices. In one embodiment, user input device(s) UID may include use of a graphical control panel configured with various control icons such as buttons, knobs, sliders, switches, indicators, etc., or any combination thereof. A user provides input to signal analysis system 120 through user input device(s). Signal analysis system 120 may manage a graphical user interface through display device DD and user input device(s) UID.

Figure 2A:
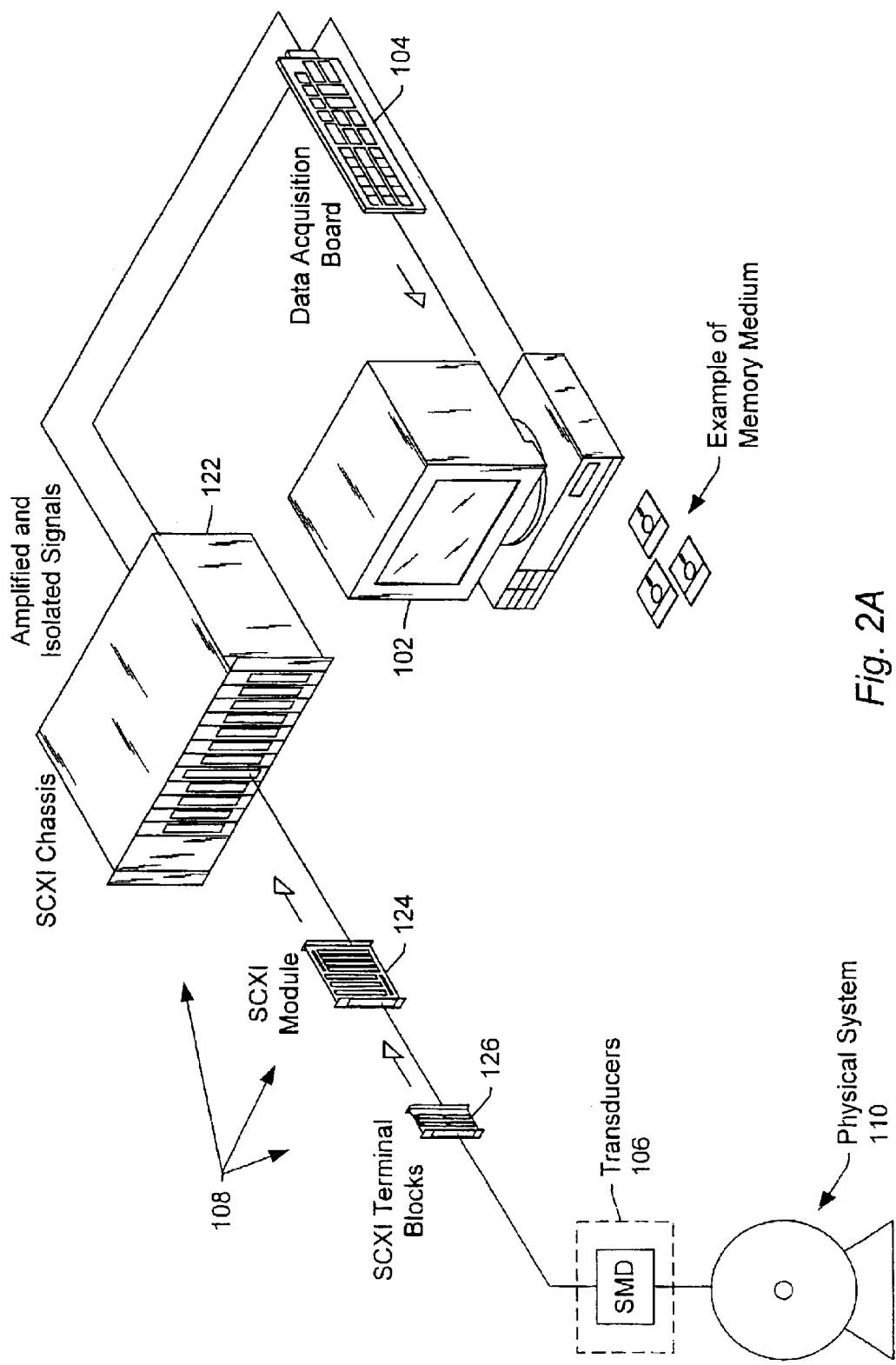
FIG. 2A illustrates one embodiment of signal analysis system comprising a computer-based measurement system, where signals generated by signal measurement device SMD are presented to computer through signal conditioning system and data acquisition (DAQ) device.
Figure 2B:
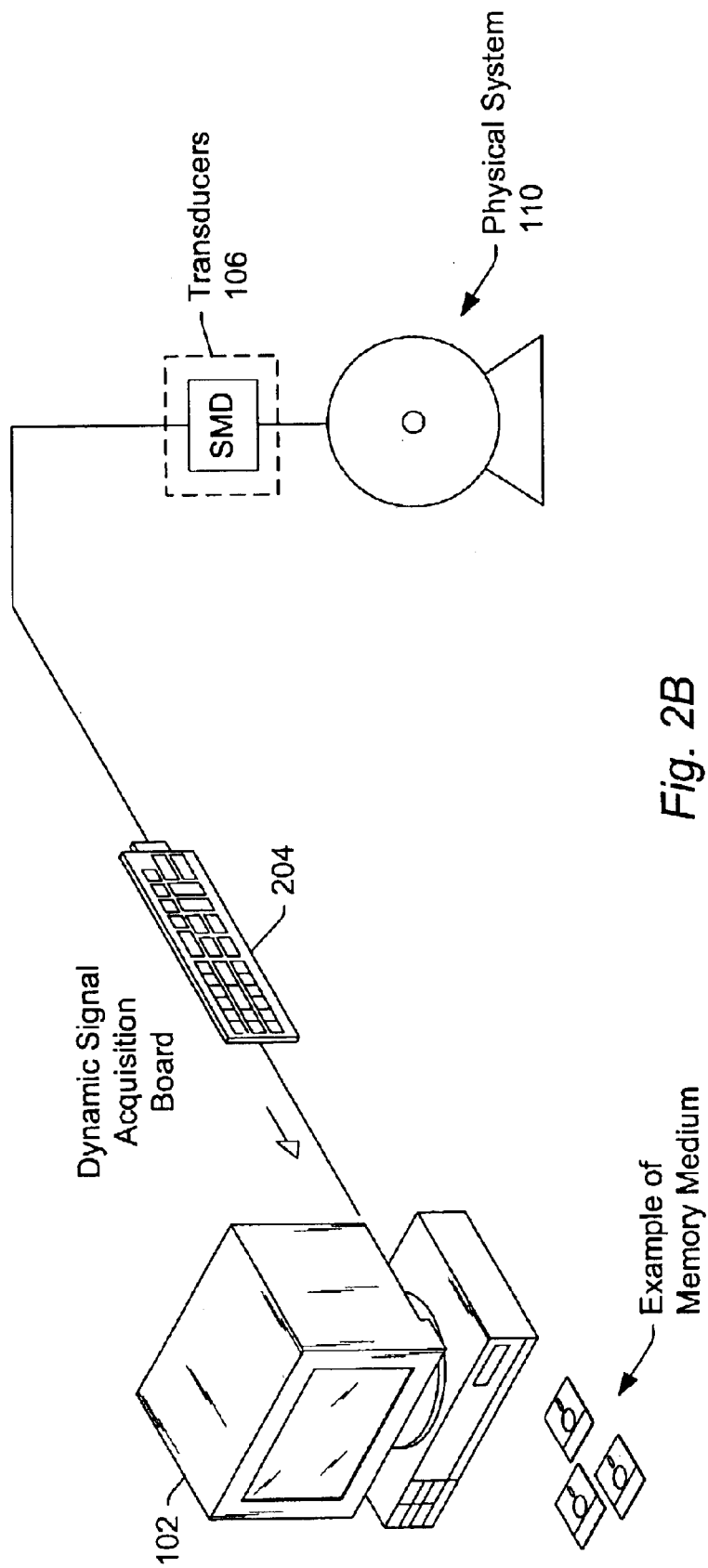
FIG. 2B illustrates a second embodiment of signal analysis system comprising a computer-based measurement system, where signals generated by signal measurement device SMD are presented to computer system through a dynamic signal acquisition (DSA) device.

FIGS. 2A and 2B—Signal Analysis Systems

FIGS. 2A and 2B illustrate exemplary embodiments of signal analysis system 120. It is noted that FIGS. 2A and 2B represent exemplary embodiments only, and various other embodiments of signal analysis system 120 may include any of various other components.

As shown, signal analysis system 120 may comprise a computer 102, a data acquisition (DAQ) device 104 coupled to the computer 102, and optionally a signal conditioning system 108 coupled to the DAQ device 104. Signal measurement device SMD may comprise a transducer 106 that couples to DAQ device 104 through the signal conditioning circuitry 108. As shown, the transducer 106, e.g., signal measurement device SMD, may couple to physical system 110 to acquire signals from physical system 110. The signal X generated by the transducer SMD and/or the tachometer signal T (generated by a separate tachometer component or by the SMD) may be optionally conditioned by the signal conditioning system 108 as shown in FIG. 2A. The conditioned signals may then be provided to DAQ device 104 as shown. Signal conditioning system 108 may connect to DAQ device 104, e.g., via one or more cables.

Signal conditioning system 108 may comprise an external chassis 122 housing one or more signal conditioning modules 124 and optionally terminal blocks 126. Signal conditioning system 108 may be used to perform signal conditioning on field signals such as the signals generated by signal measurement device SMD. As used herein, the term "signal conditioning" may include one or more of amplifying, linearizing, limiting, isolating, filtering, switching and/or multiplexing field signals (e.g., transducer excitation), among other signal processing functions. Signal conditioning system 108 may advantageously reduce the introduction of noise into the signals transmitted to DAQ device 104. DAQ device 104 may receive conditioned field signal from signal conditioning system 108 as shown in FIG. 2A. Alternatively, as shown in FIG. 2B, a dynamic signal acquisition (DSA) device 204 may directly receive the field signals from transducers 106, e.g., a separate signal conditioning device may not be necessary. DSA device 204 may operate to perform analog to digital (A/D) conversion, filtering, etc., and provide the resultant digital signals to computer 102 for processing. In one embodiment, the DSA device 204 may be a PCI Extensions for Instrumentation (PXI) device or board, although other protocols are also contemplated.

Computer system 102 may include various standard components, including a processor or central processing unit (CPU) 140, system memory 146, non-volatile memory, one or more buses, and a power supply. DAQ device 104 may be a specialized system for acquiring digital and/or analog signals from external devices. Thus, DAQ device 104 may include analog to digital (A/D) conversion circuitry and/or timer/counter circuitry. Examples of the DAQ device 104 include "E series" DAQ boards from National Instruments Corporation. DAQ device 104 may also comprise a computer-based instrument board, such as an oscilloscope, a digital multimeter (DMM), a dynamic signal analyzer, an arbitrary waveform generator, etc. An exemplary dynamic signal analyzer (DSA) board is the NI 4472, sold by National Instruments Corporation.

In one embodiment, computer 102 may comprise input/output (I/O) slots into which DAQ device 104 may be coupled. In another embodiment, computer 102 may comprise a VXI (VME Extensions for Instrumentation) chassis and bus, a GPIB (General Purpose Interface Bus) interface card, a serial port or parallel port by which DAQ device 104 may be coupled to the computer 102.

Signal analysis system 120, e.g., computer system 102, preferably includes at least one memory medium on which computer programs according to the present invention may be stored. The term "memory medium" is intended to include various types of memory or storage, including an installation medium, e.g., a CD-ROM, or floppy disks, a computer system memory or random access memory such as DRAM, SRAM, EDO RAM, Rambus RAM, EPROM, EEPROM etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system, dedicated test or measurement instrument or other device. In general, the term "computer system" can be broadly defined to encompass any system having a processor which executes instructions from a memory medium.

The memory medium preferably stores a software program for analyzing signals including order components, such as signals acquired from a rotating machine. In one embodiment, the software program may be operable to analyze signals acquired or sampled at uniform time intervals and generate order data or order information useful in analyzing the operation of physical system 110, as described below with reference to FIG. 3.

The software program may be implemented in any of various ways, including procedure-based techniques, component-based techniques, object-oriented techniques, or neural net based learning techniques, among others. For example, the software program may be implemented using ActiveX controls, C++ objects, Java objects, Microsoft Foundation Classes (MFC), or other technologies or methodologies, as desired. A CPU, such as the host CPU, executing code and data from the memory medium comprises a means for performing signal analysis on acquired signals according to the methods or flowcharts described below.

Various embodiments further include receiving, storing, and/or transmitting instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Figure 3:
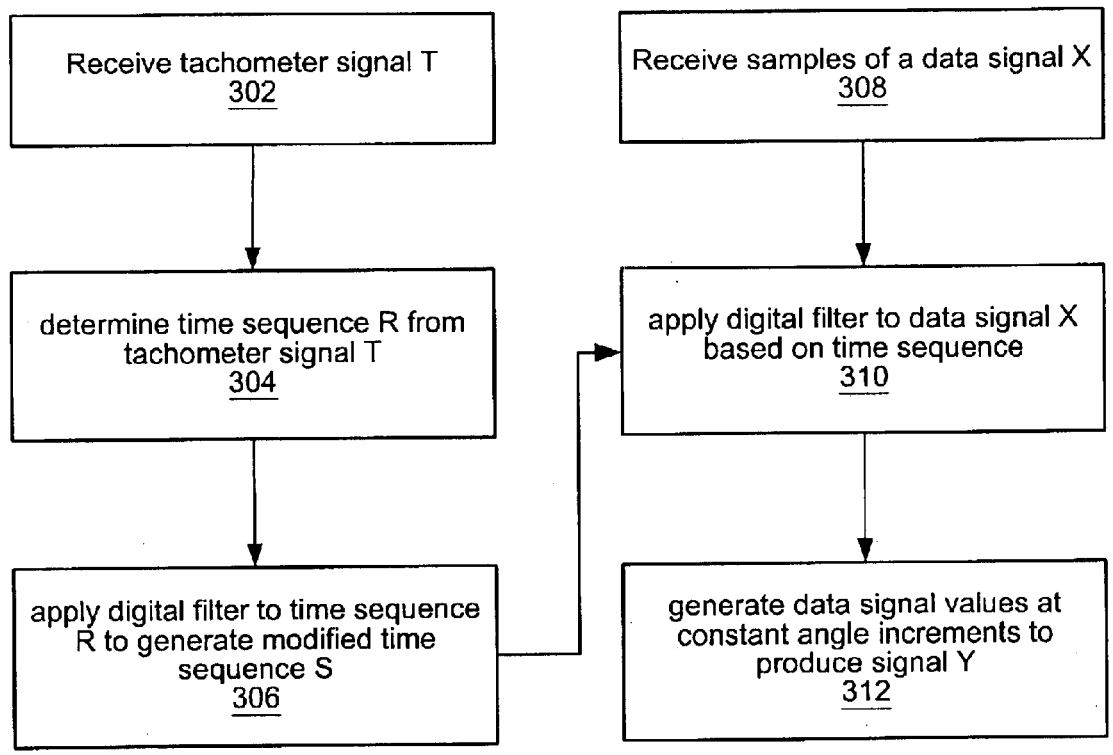
FIG. 3 presents a flowchart for one embodiment of a computer-based analysis method.

FIG. 3—Flowchart Diagram

FIG. 3 illustrates one embodiment of a method for analyzing order components present in the physical signal X acquired from physical system 110. For example, the method of FIG. 3 may be implemented by execution of the computer programs stored on the memory medium as described above.

As FIG. 3 shows, in 302 a tachometer signal T may be received. For example, as noted above, the tachometer signals may originate from a tachometer operating in conjunction with, or included in, a signal measurement device SMD. As is well known in the art, the tachometer signal may be produced in response to a rotating element, such as a shaft, in a rotary machine.

As FIG. 3 also shows, in 304, a time sequence R may be determined based on the tachometer signal T. For example, in one embodiment, the tachometer signal may be digitized or sampled, e.g., by DAQ board 104, to produce a discrete tachometer signal T, i.e., a tachometer samples. The tachometer samples may be stored in a memory medium of the computer 102 for later processing. For example, in one embodiment, the discrete tachometer signal may be analyzed, e.g., by edge detection software, to determine initial or rising/falling edges of pulses in the discrete signal, where, for example, a resulting time sequence R may indicate each time the rotating element has rotated a complete cycle, i.e., every $2\pi$ radians or 360 degrees, although other, e.g., smaller, angular intervals are also contemplated. Thus, in one embodiment, the time sequence R or series values of the samples, e.g., the arrival times of tachometer pulses for the rotating machine at substantially equal angle increments, may be determined by software. In another embodiment, the time values may be generated from the tachometer signal in a slightly different manner. For example, if the tachometer signal is TTL (Transistor-Transistor Logic) compatible, a hardware timer/counter may be used to determine the tachometer pulse arrival times (the time sequence R) directly.

In 306, a digital interpolation filter may be applied to the time sequence R, thereby generating a modified time sequence S. It is noted that in a preferred embodiment, the digital interpolation filtering is performed in software, e.g., the filtering algorithm is performed by a program executing on a computer 102. In one embodiment, the digital interpolation filter may be a finite impulse (FIR) filter, as is well known in the art. In a preferred embodiment, the digital finite impulse filter (algorithm) may be a Cascade Integrator-Comb (CIC) filter, as is also well known. The filtering process may operate to smooth and/or interpolate the time sequence R, and may be tuned (e.g., digital filtering parameters may be set) based on such attributes of the time sequence as signal-to-noise ratio, resolution of the data, etc.

One example of a CIC filter which may be used to filter the tachometer signal (samples) has the following relationship:

$$H(z) = \left(\frac{1-z^{-L}}{1-z^{-1}}\right)^N = \left(\sum_{k=0}^{L-1} z^{-k}\right)^N \quad (1)$$

where L is an interpolation factor that determines the multiples of resolution improvement from the time sequence R to time sequence S, and N determines the smoothness of the resulting signal. For example, an L value of four specifies that for each original value or sample, three additional values may be computed, resulting in a four-to-one increase in resolution of the signal. The value of N refers to the number of points in a "smoothing window", i.e., the number of points considered at a time for the interpolation.

Thus, the modified or interpolated time sequence S may be determined from the time sequence R, based on desired angle resolution. The angle resolution of the interpolated time sequence S is preferably equal to the desired angle resolution used for re-sampling the data signal, described below. In other words, the digital interpolation filter applied to the time sequence may be tuned such that precisely those time values desired for re-sampling the data signal are generated. However, in other embodiments, the resolution of the interpolated time sequence S may be greater, e.g., may be an integral multiple of the desired resolution for re-sampling.

In prior art methods, the time sequence is typically interpolated by piece-wise polynomial curve fits. However, this approach may cause discontinuities at the boundaries of each polynomial segment or piece. One benefit of the present method is that because the interpolation is performed by filter, discontinuities are avoided. Another benefit is that the expense of the system or process may be substantially less than prior art systems, in that less computation may be needed due to the fact that CIC filtering only uses summations (as opposed to multiplications, divisions, etc.). Further details of the filtering process are provided below with reference to FIGS. 4 and 5.

In 308, samples of a data signal X may be received. For example, referring back to FIGS. 2A and 2B, the data signal samples may be received from a signal measurement device SMD via a DAQ board or device 104, where the signal measurement device SMD measures an attribute of a rotating element of a machine, e.g., a rotary shaft, thereby generating an analog data signal. The resulting analog signal may be digitized, e.g., on an equal time basis, e.g., by DAQ board 104, to generate the samples. Thus, the samples may be taken at substantially equal time increments, e.g., once per millisecond, once per micro-second, etc. As described above with reference to FIG. 2A, in one embodiment, the original analog data signal X may be conditioned by a signal conditioner module 124 prior to acquisition by the DAQ board 104.

The received samples may be stored in the memory medium of the computer 102. It should be noted that although the data samples and the tachometer samples are preferably acquired at the same time, because the samples are stored, any subsequent processing of the respective samples may be performed at any later time as desired.

Once the modified time sequence has been determined in 306 and the samples of the data signal X, referred to as a digital data signal, have been received in 308, then in 310, the digital data signal X may be digitally filtered, thereby interpolating the data to increase the time resolution of the data signal. In other words, a digital interpolation filter may be applied to the received data signal samples. In one embodiment, the digital interpolation filter may be a finite impulse (FIR) filter. As noted above, the filtering process may operate to smooth the data signal (samples), and may be tuned based on signal-to-noise ratio, resolution of the data, etc. As also noted above, in prior art methods, a signal is smoothed by piece-wise polynomial curve fits and/or by analog (hardware) filtering prior to discrete sampling. In the present method, however, the data signal is preferably filtered via software, e.g., executing on the computer 102.

As indicated in 310, in a preferred embodiment, a second digital interpolation filter may be applied to the data signal X, based on the time sequence S of 306, e.g., a low-pass FIR filter.

In one embodiment, applying the second digital interpolation filter to the digital data signal X may interpolate the data signal at a substantially high ratio. Said another way, the interpolation process may increase the resolution of the digital data signal X to such a degree that the resulting digital data signal may be considered substantially continuous (at least with respect to the original resolution of the signal). In one embodiment, the digital filtering may be determined or tuned based on the determined time sequence of 306. In other words, the time values at the equal angle increments of the interpolated tachometer signal may be used to determine the digital interpolation filtering parameters for, and therefore the resolution of, the interpolated data signal. In one embodiment, the determined time sequence may be used to modify or tune the digital interpolation filter parameters, e.g., during the interpolation process, to avoid or minimize aliasing and/or imaging effects.

Finally, in 312, the interpolated data signal may be re-sampled in accordance with the determined time sequence. In other words, the interpolated data signal may be sampled at each time value in the determined time sequence. Note that each time value corresponds to an equal angle increment, and so the resulting data signal samples (the re-samples) correspond to substantially equal angle measurements of the measured attribute of the rotating element.

It is noted that in one embodiment, 310 and 312, described above, may be performed concurrently or at the same time. In other words, in one embodiment, the filtering and re-sampling may be performed in one process or operation. For example, the filter may generate interpolated values at (only) those points desired for re-sampling.

Thus, computer-based (i.e., software-based) digital filtering may be used to generate substantially equal angle domain data from equal time domain data. Further details of the filtering process are provided below with reference to FIGS. 4 and 5.

Figure 4:
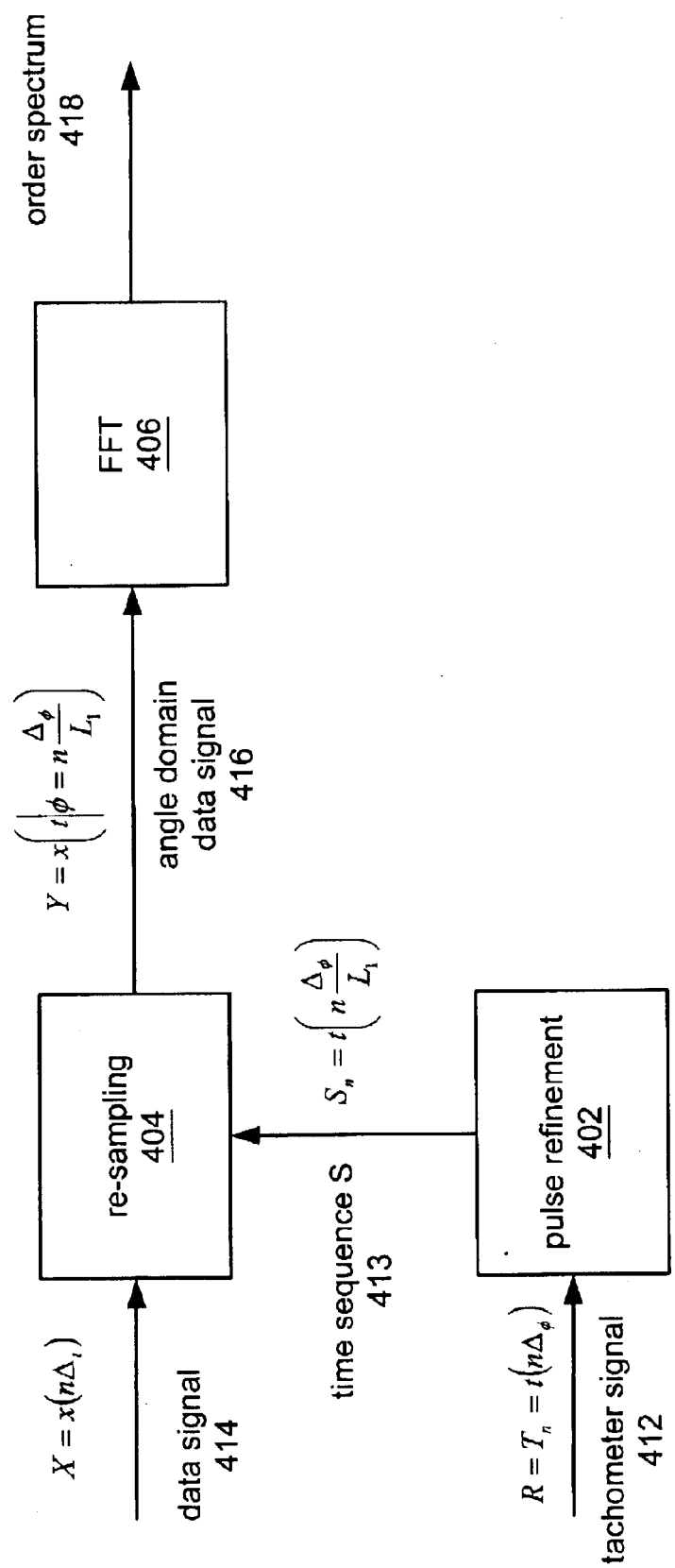
FIG. 4 is a block diagram illustrating one embodiment of the computer-based analysis method of FIG. 3.

FIG. 4—Re-Sampling Based Order Spectrum

FIG. 4 is a block diagram illustrating one embodiment of the method of FIG. 3. As FIG. 4 shows, tachometer time sequence R, indicated by $R=T_n=t(n\Delta_\phi)$ may be operated on by a pulse time sequence refinement process 402, e.g., the filtering/interpolation of 306 above. Note that the time sequence preferably comprises time values as a function of (substantially) equal angle increments, $\Delta_\phi$, as indicated. As FIG. 4 also indicates, the output of the pulse time sequence refinement process 402 is modified time sequence S with increased angular resolution, indicated by $S=t(n\Delta_\phi/L_1)$. More specifically, the original angle increment $\Delta_\phi$ is subdivided by the term $L_1$, thereby producing a time series or sequence in the desired equal angle domain. This time sequence may be used in a re-sampling process 404, as shown.

As FIG. 4 also shows, digital data signal 414, indicated by $X=x(n\Delta_t)$ may be operated on by re-sampling process 404. As indicated, the data signal X may comprise data values as a function of (substantially) equal time increments, $\Delta_t$. As shown, the re-sampling process 404 receives the data signal 414 and the pulse-refined time sequence and generates a modified data signal 416 in the angle domain, indicated by $Y=x(t|\phi=n\Delta_\phi/L_1)$. In other words, the re-sampling process 404 operates to convert the data signal in the time domain into a data signal in the angle domain. Note that as indicated, in this embodiment, the modified data signal comprises data values at the angular resolution of the pulse-refined tachometer signal, i.e., the modified time sequence S. E.g., a data value is generated (via re-sampling) for each angle increment $n\Delta_\phi/L_1$, as shown. Thus, for the case where the original tachometer signal 412 comprises time values per revolution, i.e., where $\Delta_\phi=2\pi$ radians, and where $L_1=16$, then the angular resolution for the modified data signal in the angle domain 416 would be $\pi/8$ radians, or a datum for every 22.5 degrees.

In the embodiment of FIG. 4, the modified data signal 416 is shown processed by a Fast Fourier Transform (FFT) to generate an order spectrum 418 of the data signal, as is well known in the art. The order spectrum 418 may indicate the strength of the measured attribute Of the rotating element as a function of order, and may thereby provide a means for analysis of the behavior of the element, and thus of the machine of which it is a part. Although in the embodiment shown, an FFT 406 is applied to the modified (angular domain) data signal, this "post-process" is meant to be exemplary only, and is not intended to limit the types of post-processing applied to the modified data signal. In other words, any type of post-processing, or none, may be applied to the angle domain data signal 416 as desired. For example, in one embodiment, the modified data signal 416 may simply be stored in a memory medium, output to a display or printer, or transmitted to an external system for further analysis.

Figure 5:
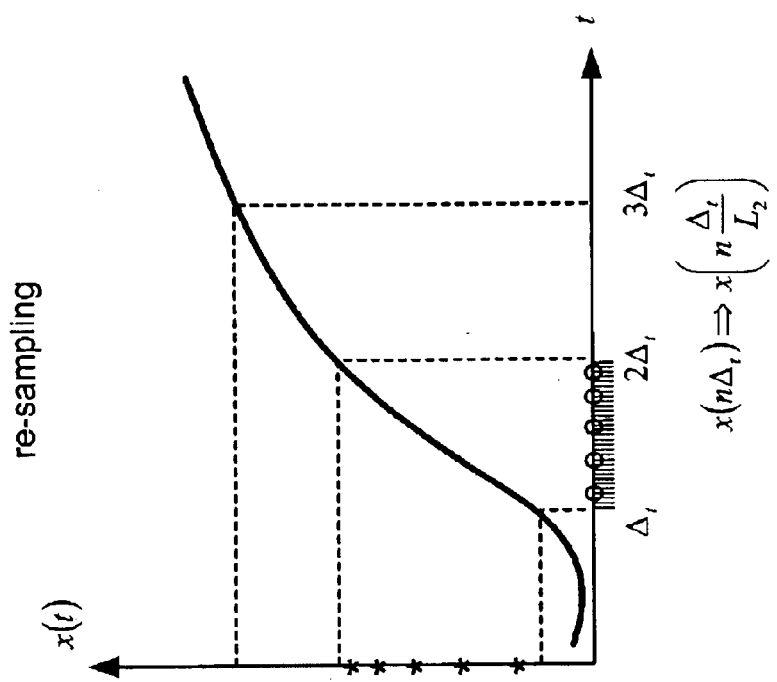
FIG. 5 illustrates a pulse refinement plot and a re-sampling plot for the method of FIGS. 3 and 4, according to one embodiment.
Figure 5:
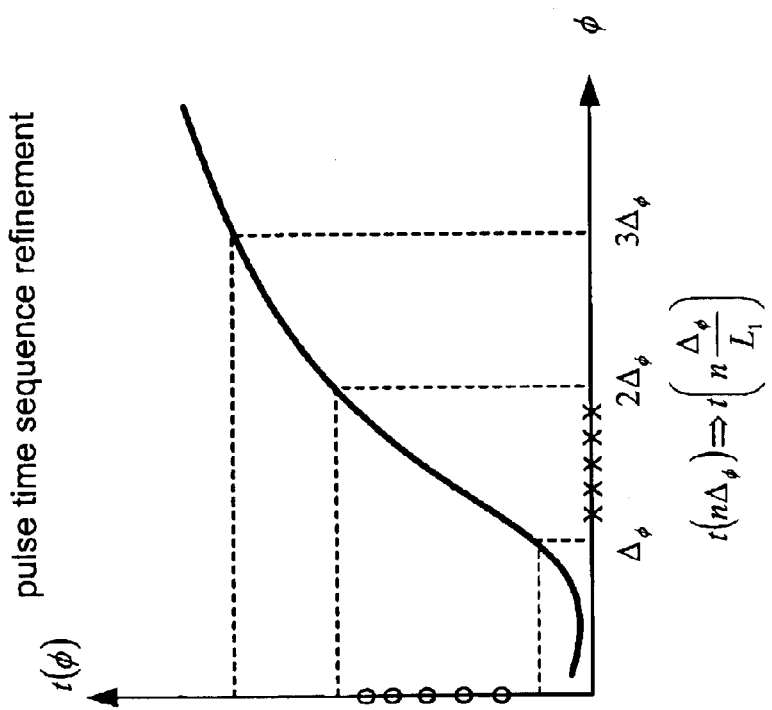

FIG. 5—Pulse Time Sequence Refinement and Re-Sampling Curves

FIG. 5 illustrates exemplary curves generated in performing the method of FIGS. 3 and 4. More specifically, FIG. 5 illustrates a modified time sequence curve generated by the pulse time sequence refinement of FIG. 4, and a modified data signal curve used in the re-sampling of FIG. 4.

As FIG. 5 shows, the pulse time sequence refinement curve presents time data as a function of phase angle, $t(\phi)$. More specifically, the original time sequence R is represented by the points on the curve marked by dashed lines, where a datum is marked per angle increment $\Delta_\phi$, and where the angle increment is in degrees or radians per tachometer pulse. As described above, the pulse time sequence refinement process 402 may interpolate the time sequence R (via a digital interpolation filter) to generate data values at angular resolutions greater than $\Delta_\phi$, i.e., at smaller angular increments than $\Delta_\phi$. In the example shown, the resolution is increased by a factor of 5. In other words, as indicated by the expression $$T_n = t(n\Delta_\phi) \Rightarrow T'_n = t\left(n\frac{\Delta_\phi}{L_1}\right) \quad (3)$$

the original angle increment is divided by the factor $L_1$, in this case, $L_1=6$, i.e., the number of interpolated points plus 1, where the new angle increments are delimited by x's, as shown. Of course, for each new angle value x, there is a corresponding interpolated time value, marked on the vertical time axis by respective o's, as shown. Note that in general, although the new angle increments are constant, the resulting new time values (marked by the o's) differ by varying amounts, based on any variance in the rotation rate of the element. For example, if the rotation rate is increased, then the distance between successive time values per angle will decrease, and vice versa. Thus, the pulse time sequence refinement process 402 may generate a modified time sequence S based on the desired resolution of (substantially constant) phase angle or order of the rotating element.

As FIG. 5 also shows, the re-sample curve presents data (representing some measured attribute of the rotating element) as a function of time, $x(t)$. More specifically, the original digital data signal is represented by the points on the curve marked by dashed lines, where a datum is marked per time increment $\Delta_t$. As described above, in one embodiment, the original data signal may be filtered/interpolated (via a digital filter) to generate data values at time resolutions greater than $\Delta_t$, i.e., at smaller time increments than $\Delta_t$. In the example shown, the resolution is increased by a factor of 32. In other words, as indicated by the expression $$x(n\Delta_t) \Rightarrow x\left(n\frac{\Delta_t}{L_2}\right) \quad (4)$$

the original time increment is divided by the factor $L_2$, in this case, $L_2=32$, i.e., the number of interpolated points plus 1, where the new time increments are delimited by (31) vertical marks, as shown. Of course, for each new interpolated time value, there is a corresponding interpolated data value, represented by the substantially continuous curve shown.

As also shown, the time sequence determined during the pulse refinement process 402, denoted by o's on the vertical time axis in the pulse refinement curve, are now marked on the horizontal time axis of the re-sampling curve. As described above, these marks represent the time values which correspond to equal angle values of the data signal. Thus, for each time value o, there is a corresponding interpolated data value, marked on the vertical (x) axis by respective *'s (asterisks), as shown.

Thus, the re-sampling process 404 may operate to determine respective interpolated data values for each of the time values of the determined time sequence, where the data values comprise values of an attribute of the rotating element in the angle domain, specifically at equal angle increments.

Figure 6:
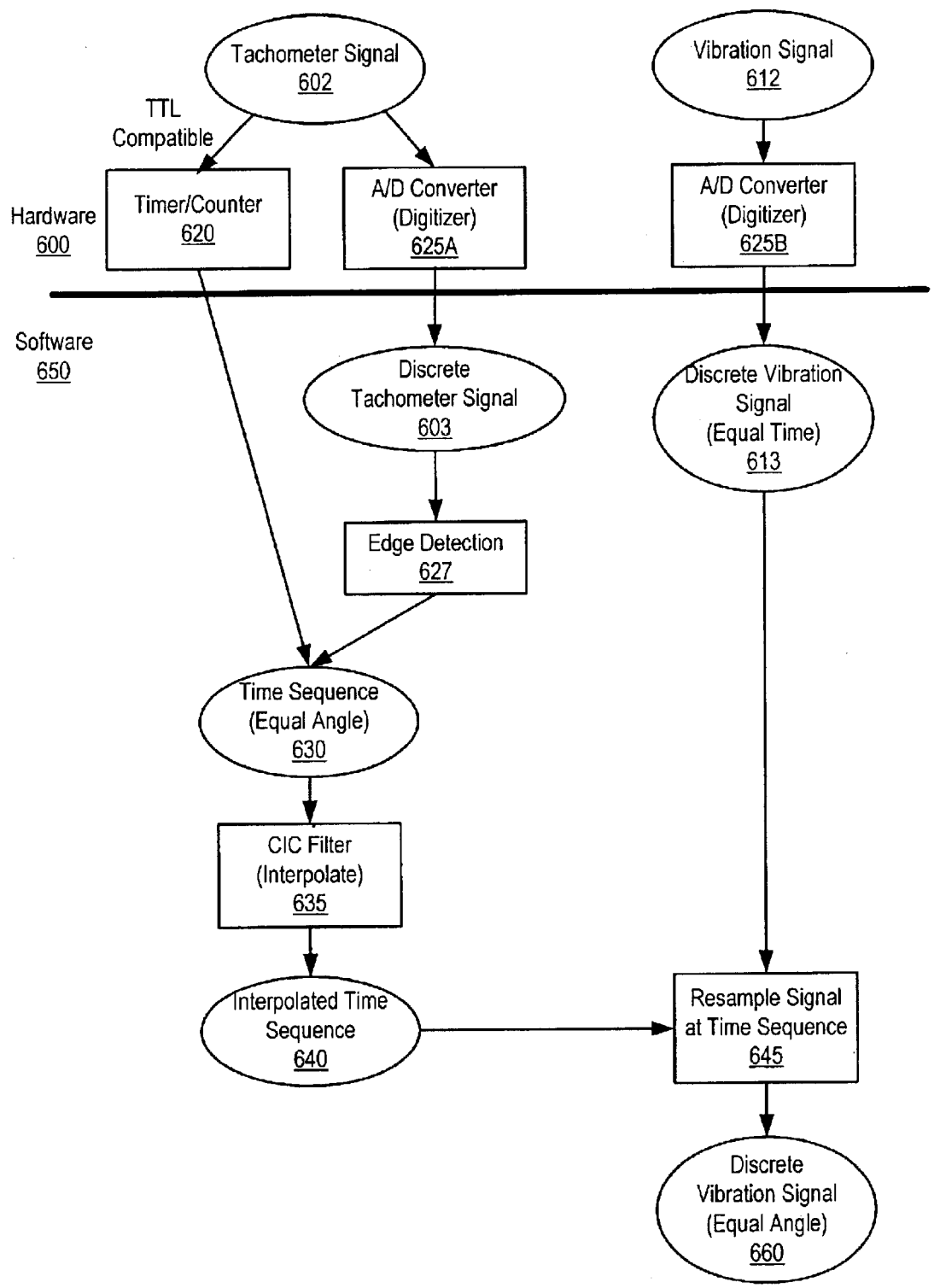
FIG. 6 is a process flow diagram for the method of FIG. 3, according to one embodiment.
Figure 7:
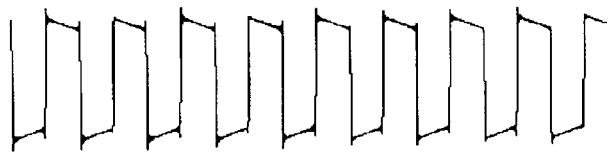
FIGS. 7–7D illustrate tachometer signal processing, according to one embodiment.
Figure 7:
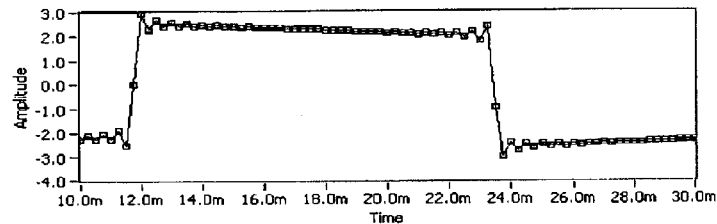
Figure 7:
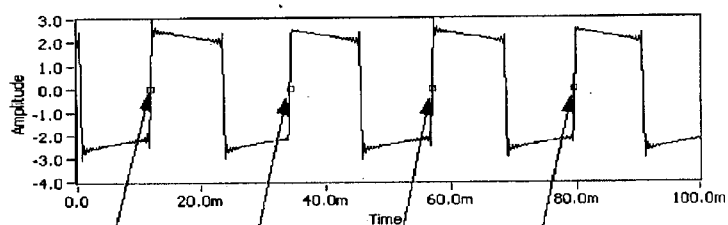
Figure 7:
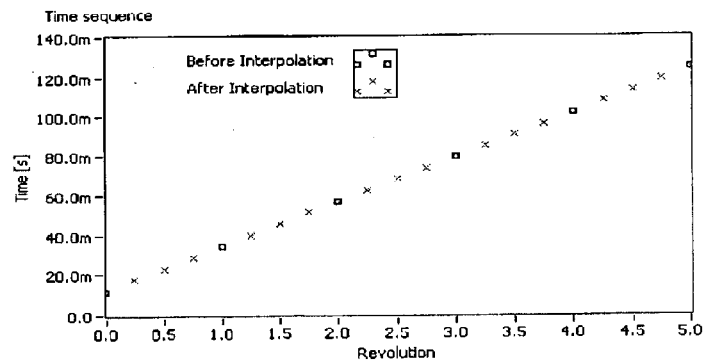
Figure 7A:
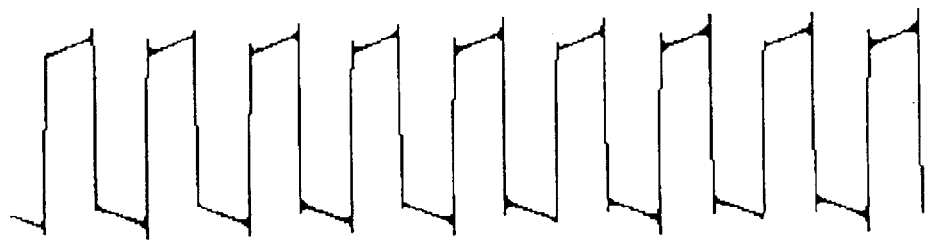
Figure 7B:
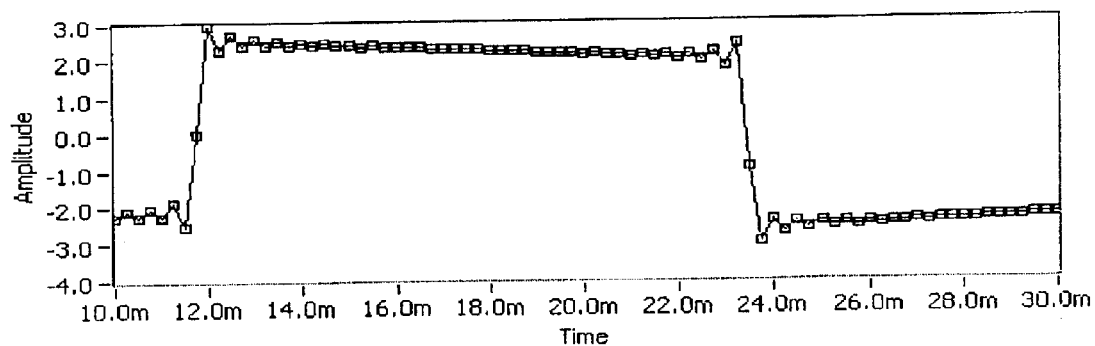
Figure 7C:
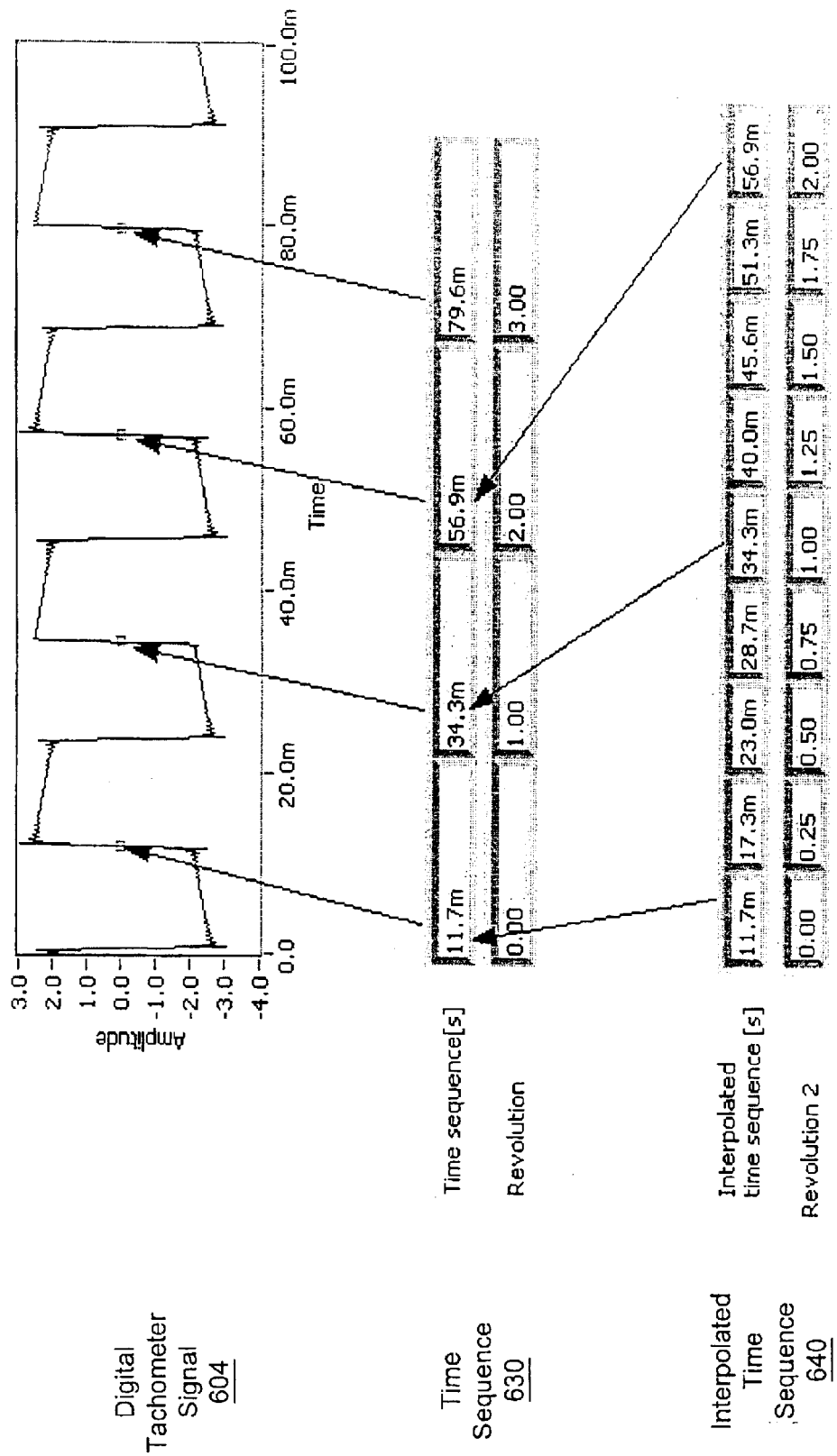
Figure 7D:
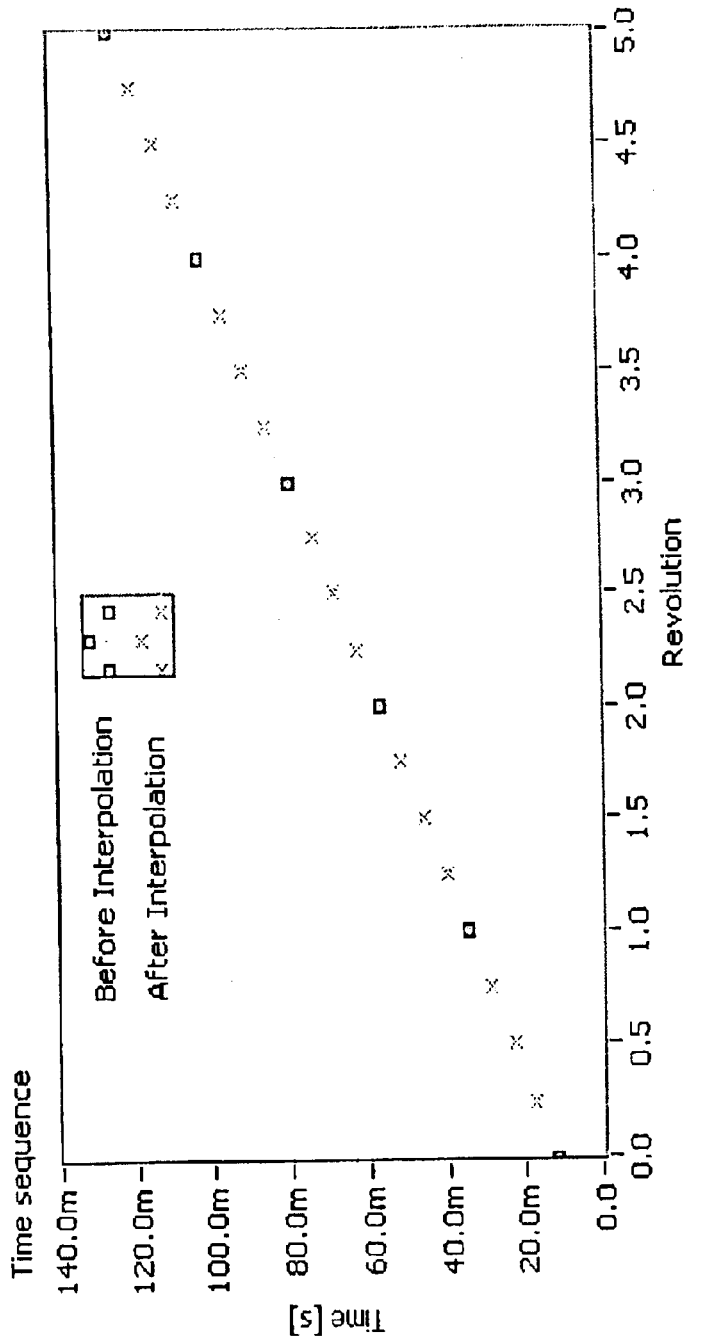

FIGS. 6–7D—Detailed Example

FIGS. 6–7D illustrate a detailed embodiment of the above system and method. More specifically, FIGS. 6–7D illustrate hardware and software functionalities involved in the re-sampling process described above.

FIG. 6 is a process flow diagram for the method described above with reference to FIG. 3. FIGS. 7–7D illustrate various signals and corresponding time sequences used and generated by the process. FIG. 7 presents the illustrations of FIGS. 7A–7D together.

As FIG. 6 shows, in one embodiment, the analog tachometer signal 602 may be received and digitized by A/D converter 625A, resulting in discrete tachometer signal 603 as shown, and as further illustrated in FIGS. 7A and 7B, respectively. The discrete tachometer signal 603 may be analyzed, e.g., by edge detection software 627, to determine digital tachometer signal 604, shown in FIG. 7C, and resulting in time values for the tachometer signal pulses, i.e., equal angle time sequence 630, also shown in FIG. 7C. In an alternative embodiment where the tachometer signal is TTL compatible, a timer/counter 620 may operate to produce the equal angle time sequence 630, i.e., time sequence R, directly, e.g., without having to digitize the signal and perform edge detection on the digitized signal, as FIG. 6 shows.

Once the equal angle time sequence 630 is determined from the tachometer signal 603, a digital interpolation filter, e.g., a CIC filter, 635 may be used to interpolate the time sequence 630, thereby generating interpolated time sequence 640, i.e., modified time sequence S. In other words, as described above with reference to FIGS. 3–5, the filter 635 may operate to increase the resolution of the time sequence 630, generating interpolated time sequence 640, as shown in FIG. 7C. The effect of the interpolation is further shown in the plot of FIG. 7D, where in this embodiment, the resolution of the time sequence is increased by a factor of four, i.e., for every original value, three additional values are generated.

As also shown in FIG. 6, vibration signal 612 is received and digitized by A/D converter 625B, thereby generating equal time discrete vibration signal 613. It is noted that in one embodiment, the A/D converter 625B may be the same device as A/D converter 625A. The equal time discrete vibration signal 613 may be re-sampled in accordance with the interpolated time sequence 640, a shown in 645 of FIG. 6, thereby generating equal angle discrete vibration signal 660.

As noted above in 310 of FIG. 3, in one embodiment, prior to, or as part of the re-sampling process, the even time discrete vibration signal 613 may be interpolated, e.g., with a interpolation filter, to smooth and/or increase the resolution of the vibration signal.

It should be noted that the digital interpolation filtering described above may be tuned to generate signals of desired resolutions. Generally, the interpolation factor should be very high, but not necessarily approaching the resolution of the precision of the time sequence values. However, in some cases, the time value in the time sequence may not be interpolated exactly, i.e., may not generate values coincident with the determined time sequence values. There are a number of ways to handle this issue. For example, in one embodiment, the nearest interpolated value in the interpolated data signal may be selected as the value for a given time point or value. In an alternate approach, a linear interpolation may be performed between the two nearest interpolated values to generate the value for the time point. The second approach is generally more accurate but may require more computation. With either method, the error may be reduced to a reasonable level by increasing the interpolation factor. For example, in the second approach, an interpolation factor of 1024 may have an error level of approximately 120 dB, which is roughly equivalent to the quantization error of a 20 bit A/D converter. This level of error is generally better than that required for most engineering applications.

It is noted that not all the interpolated values may be needed by the re-sampling process. For example, in the first approach (nearest interpolated value), only one interpolated value for each time value is needed. For the second approach (interpolation of two nearest values) the number of interpolated values needed is two. Thus, in many cases, the vast majority (e.g., up to 99.9%) of interpolated values may remain unused. This fact may be used to increase the efficiency of the process. For example, in a preferred embodiment, the interpolation filter may simply be shifted to the position of a desired value, and the result calculated. In other words, all of the other (unused) values may simply be skipped, i.e., may not be calculated in the first place, thereby greatly reducing the computational requirements of the method. Thus, in the preferred embodiment, the filtering of the data signal may be performed as part of the re-sampling (or conversely, the re-sampling may be performed as part of the interpolation or filtering).

Figure 8:
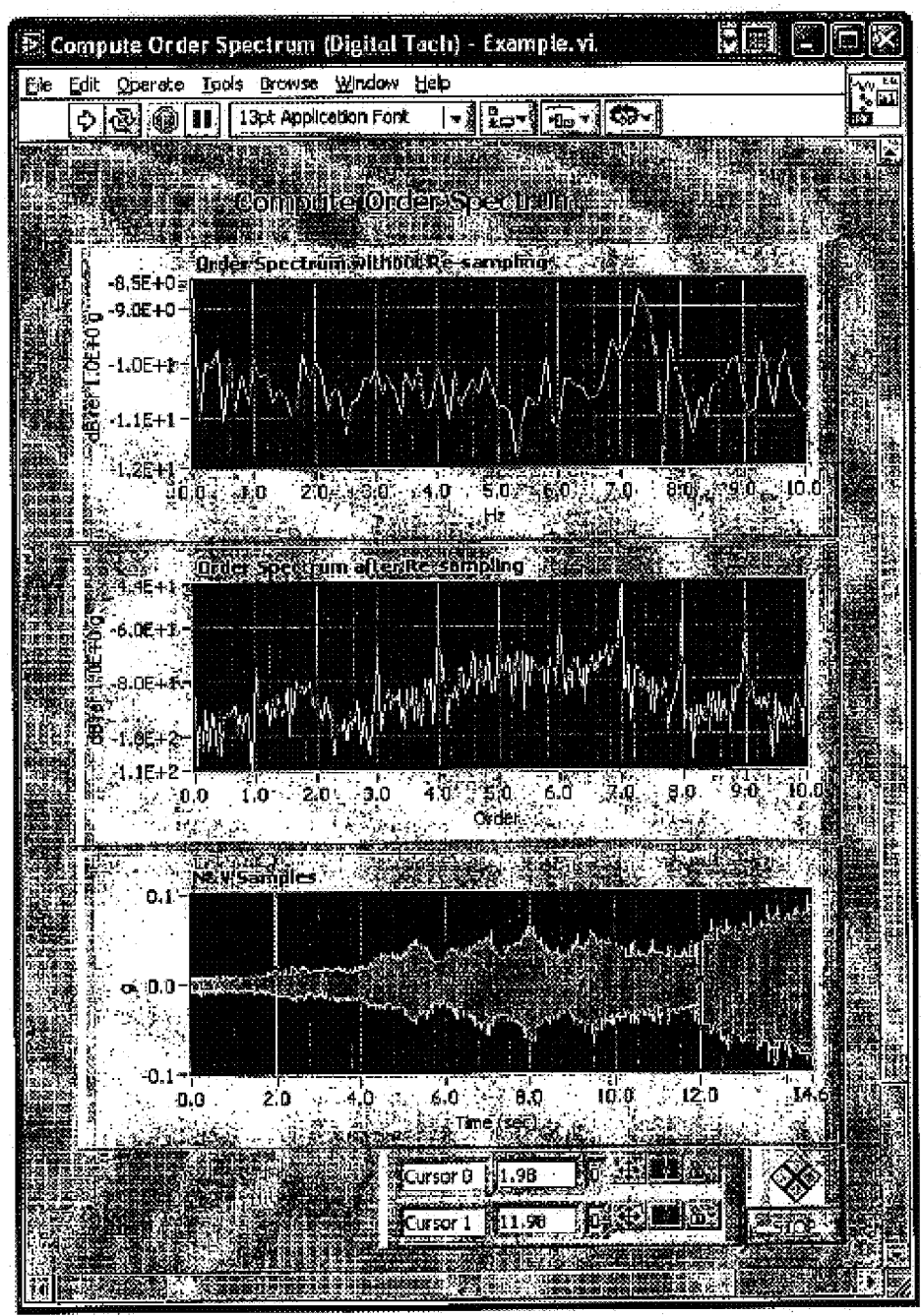
FIG. 8 illustrates order spectra with and without re-sampling.

FIG. 8—Comparison of Sampled and Re-Sampled Signals

FIG. 8 illustrates differences between computed order spectra of a data signal with and without re-sampling, according to one embodiment of the present invention. As FIG. 8 shows, the top plot presents an example order spectrum without re-sampling of the data signal, while the middle plot presents the order spectrum after re-sampling has been performed on the data signal. As may be seen, the spectrum of re-sampled data samples (middle plot) better describes various orders than its un-re-sampled counterpart (top plot). In other words, the spectrum orders are much more apparent in the re-sampled case.

Figure 9A:
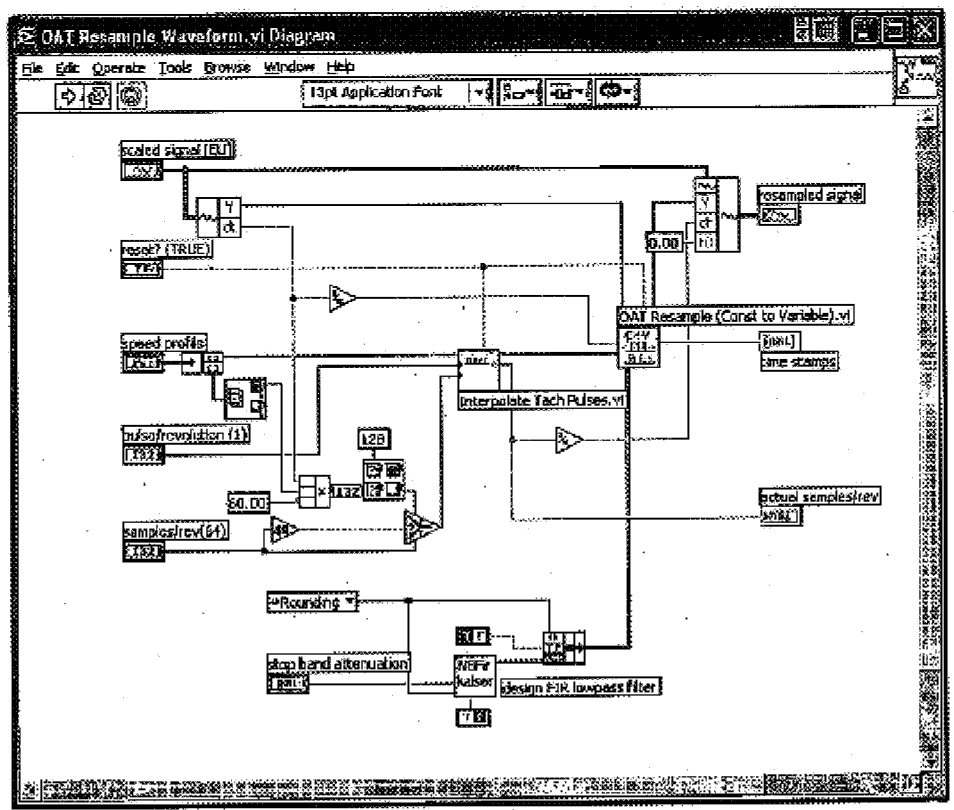
FIGS. 9A–9C illustrate graphical programs implementing embodiments of the present invention.
Figure 9B:
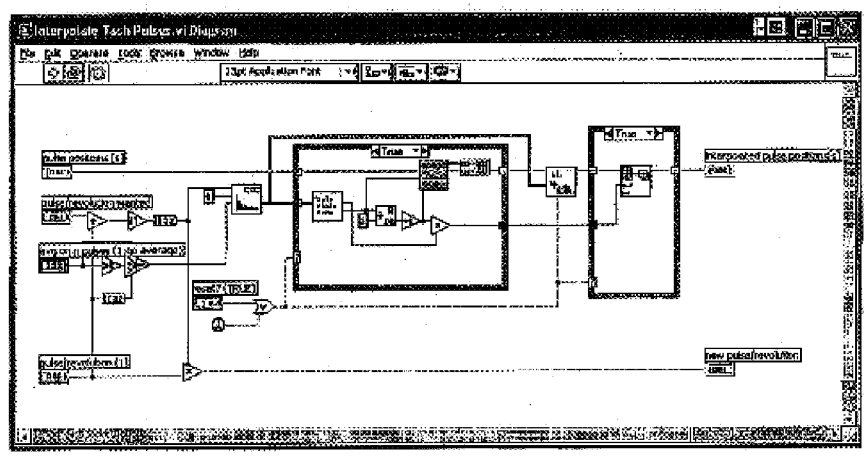
Figure 9C:
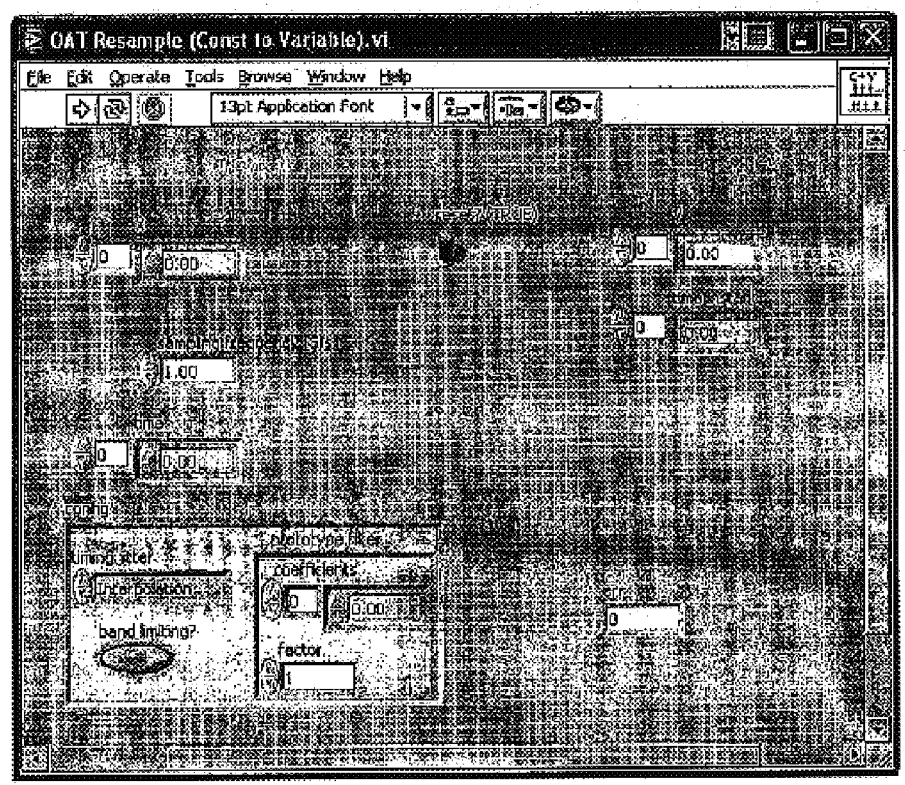

FIGS. 9A–9C—Example Implementation of One Embodiment

FIGS. 9A–9C illustrate example graphical programs, also referred to as virtual instruments (VIs) implementing one embodiment of the present invention. Although the examples shown are implemented in National Instruments' LabVIEW graphical development system, it is noted that any other development environments or systems may also be used as desired, including other graphical development environments, text-based programming languages and systems, and so forth.

FIG. 9A illustrates a block diagram of a graphical program implementing the one embodiment of the above-described method at a high level. In other words, FIG. 9A presents a primary block diagram of a graphical program for generating a re-sampling based order spectrum, i.e., order-domain data, from time-domain data. As the block diagram indicates, the implementation contains the following three basic steps: interpolating a time sequence of tachometer pulses, designing/specifying/initializing a low-pass FIR filter, and re-sampling data samples (e.g., time domain vibration signals), thereby generating re-sampled signal (Y).

It should be noted that this block diagram calls or includes other VIs with corresponding block diagrams, e.g., an "interpolate tach pulses" VI, a "design FIR lowpass filter" VI, an "OAT Resample (Const to Variable)" VI, and so forth. For example, FIG. 9B illustrates a block diagram of a graphical program implementing one embodiment of the tachometer pulse interpolation functionality (the interpolate tach pulses VI) referenced in FIG. 9A. As FIG. 9B shows, the tach pulse interpolation VI receives initial pulse position(s), i.e., time sequence R, and interpolates them in accordance with input specifying the filtering parameters, thereby generating interpolated pulse position(s), i.e., modified time sequence S. As mentioned above, in a preferred embodiment, a CIC (Cascade Interpolate Comb) filter is used to perform the interpolation. As also described above, compared to the polynomial curve-fitting method of the prior art, the CIC not only typically provides a smoother curve, but also is suitable for hardware implementation, in that the filtering may be performed using only simple arithmetic operations, e.g., summation and multiplication, summation and subtraction, or just summation.

FIG. 9C illustrates one embodiment of a front panel VI for the re-sampling operation referenced in FIG. 9A. As FIG. 9C shows, the front panel may be operable to receive and/or display user input specifying the filter/re-sampling operations that generate angle- or order-domain data from time-sampled or time-domain data. Thus, in the embodiment shown, instead of using polynomial-based curve-fitting, the time sequence is re-sampled by applying a low-pass FIR filter to re-sample the time sequence sampled in constant time intervals. A major advantage of this approach over prior art methods (besides computational efficiency) is that the resulting re-sampled time sequence is smoother, e.g., than the piecewise polynomial fit approach.

Thus, in accordance with user supplied (or default) specifications, various embodiments of the present method may be implemented using graphical programming techniques, although, as noted above, any other programming techniques may also be used as desired, e.g., compilable or interpretable text-based programming languages, etc. It is also noted that in other embodiments, various portions of the method, e.g., the FIR filters, may be implemented in hardware, such as an FPGA, dedicated logic circuit, etc.

Thus, various embodiments of the system and method described above may be used to convert equal time data related to a rotating element of a machine to equal angle data, thereby transforming time data into the angle domain. Such angle domain data may then be used to more effectively analyze phenomena associated with rotary equipment.

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. A method for analyzing a physical system having a rotating element, the method comprising:
   receiving a tachometer signal from a tachometer, wherein the tachometer signal comprises rotation speed information for the rotating element;
   determining a time sequence using the tachometer signal, wherein the time sequence comprises time values for the rotating element at substantially equal angle increments;
   applying a first digital interpolation filter to the time sequence to generate a modified time sequence;
   receiving a digital data signal, wherein the digital data signal comprises a second plurality of samples, and wherein the digital data signal comprises data for the rotating element at substantially equal time increments;
   applying a second digital interpolation filter to the digital data signal to generate a modified data signal;
   re-sampling the modified data signal using the modified time sequence to generate an angle domain data signal, wherein the angle domain data signal comprises data signal values at substantially equal angle increments, and wherein the angle domain data signal is usable to analyze the physical system.

2. The method of claim 1, wherein at least one of the first digital interpolation filter and the second digital interpolation filter comprises a finite impulse response (FIR) filter.

3. The method of claim 1, wherein the first digital interpolation filter comprises a Cascade Integrator-Comb filter.

4. The method of claim 1, wherein said receiving the tachometer signal from the tachometer comprises:
   an analog-to-digital converter (ADC) receiving the tachometer signal from the tachometer, wherein the tachometer measures rotation of the rotating element;
   the ADC digitizing the analog tachometer signal to generate a discrete tachometer signal;
   performing edge detection on the discrete tachometer signal; and
   generating the time sequence based on said edge detection.

5. The method of claim 1, wherein said receiving the tachometer signal from the tachometer comprises:
   a timer/counter receiving the tachometer signal from the tachometer, wherein the tachometer signal is a TTL compatible square wave;
   the timer/counter generating timer/counter output based on the tachometer signal; and
   generating the time sequence based on the timer/counter output.

6. The method of claim 1, further comprising:
   an analog-to-digital converter (ADC) receiving an analog data signal from a sensor, wherein the sensor measures an attribute of the rotating element; and
   the ADC digitizing the analog data signal to generate the digital data signal.

7. The method of claim 1, further comprising:
   performing a Fast Fourier Transform (FFT) on the angle domain signal to generate order spectrum information, wherein the order spectrum information is usable to analyze the physical system.

8. The method of claim 1,
   wherein the time sequence is at a first angular resolution; and
   wherein said applying the first digital interpolation filter to the time sequence to generate the modified time sequence comprises generating the modified time sequence at a second angular resolution, wherein the second angular resolution is higher than the first angular resolution.

9. The method of claim 1, wherein said applying the second digital interpolation filter and said re-sampling the modified data signal are performed at the same time by:
   shifting the second digital interpolation filter to each value of the determined time sequence; and
   calculating a respective re-sample value for the data signal at each said value, thereby re-sampling the data signal to generate the angle domain data signal.

10. The method of claim 1, further comprising:
    outputting the angle domain data signal to one or more of:
    a storage medium; and
    a display device for display.

11. A system for analyzing an input signal, the system comprising:
    an input;
    a processor coupled to the input;
    a memory medium coupled to the processor which stores analysis software;
    wherein the input is operable to:
      receive a tachometer signal from a tachometer, wherein the tachometer signal comprises rotation speed information for a rotating element of a physical system; and
      receive samples of an input signal, wherein the input signal is sampled in time, wherein the input signal comprises information related to an attribute of the rotating element, and wherein the input signal comprises data for the rotating element at substantially equal time increments;
    wherein the analysis software is executable by the processor to:
      determine a time sequence based on the tachometer signal, wherein the time sequence comprises time values for the rotating element at substantially equal angle increments;

apply a first digital interpolation filter to the time sequence to generate a modified time sequence;

apply a second digital interpolation filter to the samples of the input signal to generate a modified input signal; and re-sample the modified input signal using the modified time sequence to generate an angle domain signal, wherein the angle domain signal comprises signal values at substantially equal angle increments, and wherein the angle domain signal is usable to analyze the physical system.

12. The system of claim 11, further comprising:

a tachometer coupled to the input, wherein the tachometer is operable to measure rotation of the rotating element to generate the tachometer signal; and an analog to digital converter (ADC) coupled to the tachometer, wherein the ADC is operable to digitize the generated tachometer signal to generate a digital tachometer signal comprising samples of the tachometer signal.

13. The system of claim 12, wherein said analysis software is further executable to:

perform edge detection on the digital tachometer signal to determine pulse times for the tachometer signal;

wherein said pulse times indicate substantially equal angle samples of the tachometer signal, and wherein said pulse times comprise the time sequence.

14. The system of claim 13, wherein, in applying a first digital interpolation filter to the time sequence to generate the modified time sequence, the analysis software is executable to:

apply the first digital interpolation filter to the pulse times to generate the modified time sequence.

15. The system of claim 14, wherein the time sequence has a first angular resolution; and wherein, in said applying the first digital interpolation filter to the time sequence to generate the modified time sequence, the analysis software is executable to generate the modified time sequence at a second angular resolution, wherein the second angular resolution is higher than the first angular resolution.

16. The system of claim 11, further comprising:

a tachometer coupled to the input, wherein the tachometer is operable to measure rotation of the rotating element to generate the tachometer signal; and a timer/counter coupled to the tachometer, wherein the timer/counter is operable to detect the edges of the generated tachometer signal to generate the time sequence.

17. The system of claim 11, further comprising:

a transducer coupled to the input, wherein the transducer is operable to measure the attribute of the rotating element to generate the input signal; and an ADC coupled to the transducer, wherein the ADC is operable to digitize the generated input signal to generate the samples of the input signal.

18. The system of claim 17, further comprising:

a signal conditioner coupled to the transducer and to the ADC, wherein the signal conditioner is operable to condition the input signal and send the conditioned signal to the ADC.

19. The system of claim 17, further comprising:

a data acquisition (DAQ) device coupled to the transducer and to the input, wherein the DAQ device comprises the ADC.

20. The system of claim 11, wherein at least one of the first digital interpolation filter and the second digital interpolation filter comprises a finite impulse response (FIR) filter.

21. The system of claim 11, the first digital interpolation filter comprises a Cascade Integrator-Comb filter.

22. The system of claim 11, wherein said analysis software is further executable by the processor to:

perform a Fast Fourier Transform (FFT) on the angle domain signal to generate order spectrum information, wherein the order spectrum information is usable to analyze the physical system.

23. The system of claim 11, further comprising:

an output coupled to the processor, wherein the output is operable to output the angle domain data signal for storage and/or display.

24. The system of claim 11, wherein said analysis software is further executable by the processor to apply the second digital interpolation filter and re-sample the modified data signal at the same time.

25. The system of claim 24, wherein, in applying the second digital interpolation filter and re-sampling the modified data signal at the same time, the analysis software is executable to:

shift the second digital interpolation filter to each value of the determined time sequence; and calculate a respective re-sample value for the data signal at each said value, hereby re-sampling the data signal to generate the angle domain data signal.

26. A carrier medium which stores program instructions for analyzing a physical system having a rotating element, wherein the program instructions are executable to perform:

receiving a digital tachometer signal, wherein the digital tachometer signal comprises a first plurality of samples, and wherein the digital tachometer signal comprises rotation speed information for the rotating element;

determining a time sequence using the digital tachometer signal, wherein the time sequence comprises time values for the rotating element at substantially equal angle increments;

applying a first digital interpolation filter to the time sequence to generate a modified time sequence;

receiving a digital data signal, wherein the digital data signal comprises a second plurality of samples, and wherein the digital data signal comprises data for the rotating element at substantially equal time increments;

applying a second digital interpolation filter to the digital data signal to generate a modified data signal; and re-sampling the modified data signal using the determined time sequence to generate an angle domain data signal, wherein the angle domain data signal comprises data signal values at substantially equal angle increments, and wherein the angle domain data signal is usable to analyze the physical system.

27. A system for analyzing an input signal, the system comprising:

means for receiving a tachometer signal, wherein the digital tachometer signal comprises rotation speed information for the rotating element;

means for determining a time sequence using the tachometer signal, wherein the time sequence comprises time values for the rotating element at substantially equal angle increments;

means for applying a first digital interpolation filter to the time sequence to generate a modified time sequence;

means for receiving a digital data signal, wherein the digital data signal comprises a plurality of samples, and wherein the digital data signal comprises data for the rotating element at substantially equal time increments;

means for applying a second digital interpolation filter to the digital data signal to generate a modified data signal; and means for re-sampling the modified data signal using the determined time sequence to generate an angle domain data signal, wherein the angle domain data signal comprises data signal values at substantially equal angle increments, and wherein the angle domain data signal is usable to analyze the physical system.

* * * * *

UNITED STATES PATENT AND TRADEMARK OFFICE
CERTIFICATE OF CORRECTION

PATENT NO. : 6,801,873 B1
DATED : October 5, 2004
INVENTOR(S) : Jin et al.

It is certified that error appears in the above-identified patent and that said Letters Patent is hereby corrected as shown below:

Column 18,
Line 34, please delete "hereby" and substitute -- thereby --.

Signed and Sealed this

First Day of February, 2005

JON W. DUDAS
*Director of the United States Patent and Trademark Office*